United States Patent
Lewis et al.

(10) Patent No.: US 6,738,360 B1
(45) Date of Patent: May 18, 2004

(54) SYSTEM AND METHOD FOR RELIABLE VIDEO TRANSMISSION IN WIRELESS ASYNCHRONOUS TRANSFER MODE NETWORKS WITH FADING

(75) Inventors: Arianne M. Lewis, Chestnut Hill, MA (US); Arnold M. Michelson, Westwood, MA (US); Evert Basch, Stow, MA (US); Allen H. Levesque, Chelmsford, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/425,255

(22) Filed: Oct. 22, 1999

(51) Int. Cl.⁷ ............................................. H04B 7/00
(52) U.S. Cl. .................. 370/310.1; 370/905; 455/67.1; 455/426
(58) Field of Search ................................ 455/414, 423, 455/504, 507, 426, 63, 67.1; 370/345, 333, 338, 349, 310.1, 395.52, 395.53, 396.6, 905

(56) References Cited

U.S. PATENT DOCUMENTS

| | | | | |
|---|---|---|---|---|
| 4,189,622 A | * | 2/1980 | Foshee ........................ | 375/373 |
| 5,430,743 A | * | 7/1995 | Marturano et al. ......... | 714/708 |
| 5,563,887 A | * | 10/1996 | Harasaki .................... | 370/94.1 |
| 5,777,986 A | * | 7/1998 | Grossman .................. | 370/235 |
| 5,875,199 A | * | 2/1999 | Luthi .......................... | 714/780 |
| 5,928,327 A | * | 7/1999 | Wang et al. ................ | 709/217 |
| 5,946,357 A | * | 8/1999 | Sandin et al. .............. | 375/296 |
| 6,000,054 A | * | 12/1999 | Bahr et al. .................. | 714/786 |
| 6,035,007 A | * | 3/2000 | Khayrallah et al. ......... | 375/341 |
| 6,044,485 A | * | 3/2000 | Dent et al. .................. | 714/774 |
| 6,061,096 A | * | 5/2000 | Limberg ...................... | 348/555 |
| 6,173,162 B1 | * | 1/2001 | Dahlman et al. ............. | 455/69 |
| 6,246,883 B1 | * | 6/2001 | Lee ............................. | 455/507 |
| 6,272,348 B1 | * | 8/2001 | Saario et al. ............... | 455/452 |
| 6,378,101 B1 | * | 4/2002 | Sinha et al. ................. | 714/755 |

OTHER PUBLICATIONS

A. M. Michelson, et al., "Reliable ATM Transmission in Tactical Networks", 2ⁿᵈ Annual FEDLAB Symposium Proceedings, Feb. 1998, pp. 246–250.

* cited by examiner

Primary Examiner—Lee Nguyen
Assistant Examiner—Charles Craver
(74) Attorney, Agent, or Firm—James K. Weixel

(57) ABSTRACT

The present invention relates to a system and method for reliably transmitting data over wireless communication channels. The invented system 10 comprises a transmitting device 12 having an error control coding circuit 20 and an interleaver circuit 22 in communication with each other. The invented system 10 also includes a receiving device 14 having an error control decoding circuit 26 and a de-interleaver circuit 28 in communication with each other. The transmitting device 12 and the receiving device 14 communicate over a wireless communication channel 16. The error control coding circuit 20 applies an error control code to the data before it is transmitted over the communication channel 16. The data is also interleaved prior to being transmitted. After transmission over the communication channel 16, the data is de-interleaved and any transmission errors are detected and corrected. The interleaving "spreads out" transmission errors over several data cells and thus makes the error control and correction process more effective and efficient.

21 Claims, 2 Drawing Sheets

SYSTEM AND METHOD FOR RELIABLE VIDEO TRANSMISSION IN WIRELESS ASYNCHRONOUS TRANSFER MODE NETWORKS WITH FADING

STATEMENT REGARDING FEDERALLY SPONSORED RESEARCH OR DEVELOPMENT

This invention was made with Government support under Contract No. DAAL-01-96-02-0002, awarded by the U.S. Army. The Government has certain rights in this invention.

TECHNICAL FIELD OF THE INVENTION

The present invention relates generally to the field of wireless electronic communications. In particular, the present invention pertains to a specialized communication technique that supports reliable Asynchronous Transfer Mode (ATM) transmission of compressed video (e.g. MPEG video) on fading radio channels.

BACKGROUND

With the popularization of the Internet and the general increase in the technical sophistication of wireless electronic communication techniques, there has been an increased demand for efficient and reliable transmission of multimedia applications over wireless networks. Asynchronous Transfer Mode (ATM) is a known network communication protocol that provides for high speed switching and multiplexing of voice, video, data, and imagery regardless of the format. Application data is transmitted in short, fixed-size ATM cells comprising a five-byte header (40 bits) and a 48-byte payload (384 bits). The header conveys addressing information while the payload contains information bits that represent a segment of user data.

ATM is designed to facilitate high-speed transport of multimedia services in high quality commercial networks where communication channels have large bandwidths and low error rates. For wireless applications, though, link bandwidths are generally small and error rates large. The small bandwidth problem has generally been solved by using data compression techniques (such as MPEG video format) and/or by limiting the number of network users. However, a more fundamental problem with using ATM in connection with wireless communications has been that the quality of wireless links can be poor. Poor quality communication channels, referred to as "noisy" or "fading" channels, can result in unacceptable high levels of data transmission errors.

To monitor and correct for data transmission errors, one existing communication system applies error control codes to the headers and payloads of ATM cells. These error control codes are inserted into the headers and payloads of the ATM cells before transmission over the communication channel and are used by a receiving device to monitor the integrity of the data received and to correct transmission errors in the data. To assure a low cell loss rate, a very powerful code is used for the header, and to minimize the overhead associated with error control codes and achieve adequate throughput, a somewhat weaker code is used for the payload.

ATM transmission of compressed video poses different problems than transmission of voice, data, and imagery. To achieve a superior quality of service for MPEG transmissions, it is necessary to deliver a very small bit error rate (BER), on the order of $10^{-6}$ to $10^{-8}$, to the video decoder in the receiving device. This acceptable BER range is more stringent than that which is required for the effective transmission of voice, data, and imagery. If the delivered BER is larger than $10^{-6}$, the degradation in picture quality can result in picture flashes, jumps, jerkiness, or even the entire picture going blank for a period of time. The necessarily low BER has been an impediment to the effective and efficient transmission of MPEG video over severely noisy or fading radio channels because such channels have very high inherent BERs and exhibit a mixture of independent and burst-error phenomena.

Ordinarily, to improve the performance of a coded communication system, the power of the error control codes are increased, thereby increasing the amount of coding overhead. While the additional overhead reduces the system throughput, the more powerful error control codes are better able to ensure the integrity of the data being transmitted. However, this approach is ineffective in connection with severely fading radio channels. Even when very powerful error control codes are used, severely fading channels still result in receipt of excessive uncorrectable error patterns, particularly because the transmission errors incurred over a severely fading channel typically occur in bursts and tend to be very concentrated. This is unacceptable when transmitting MPEG video because of the very low BER required to be delivered to the video decoder.

Accordingly, prior to this invention, the quality of MPEG video transmitted over fading radio channels was inferior. The present invention provides for a superior quality of service for MPEG video on severely fading radio channels.

SUMMARY OF THE INVENTION

The present invention comprises a system and communication technique for ATM transmission of compressed video (MPEG) that provides reliable data transmission over severely fading wireless networks. The invented system includes a transmitting device and a receiving device that communicate with each other via a wireless communication channel. The transmitting device includes a video encoder, an encapsulator circuit, a Bose-Chaudhuri-Hocquenghem (BCH) link coding circuit, a modulator, and a bit-by-bit interleaver circuit. The receiving device includes a video decoder, a decapsulator circuit, a BCH link decoding circuit, a demodulator and a bit-by-bit de-interleaver. The transmitting device transmits MPEG video data using ATM over the communication channel to the receiving device.

Prior to transmitting the MPEG data, the transmitting device applies binary BCH error control codes to each ATM data cell. Then, a predetermined number of ATM cells are interleaved. The interleaved cells are transmitted across the communication channel to the receiving device. The receiving device de-interleaves the ATM cells, detects and corrects transmission errors in the data, removes the binary BCH error control overhead and provides the error-corrected data to the video decoder to ultimately produce video on a display device. The technique of interleaving the ATM cells prior to transmission and de-interleaving the data after receipt essentially "spreads out" the transmission errors over many ATM cells instead of allowing them to be concentrated in a few ATM cells. The BCH codes are more effective at detecting and correcting errors in ATM cells if each cell contains a relatively small number of errors.

DETAILED DESCRIPTION OF THE INVENTION

Figure 1:
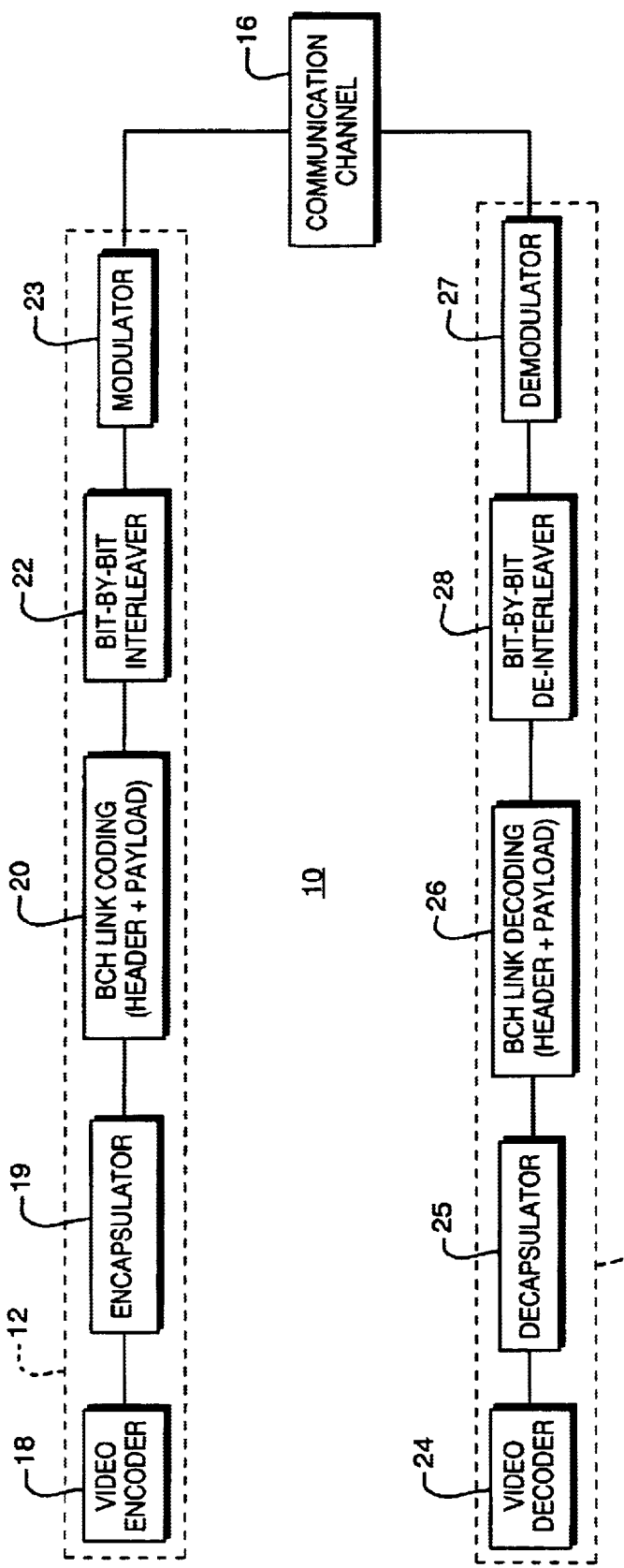
FIG. 1 is a block diagram of a preferred embodiment of the invented system.

Referring to FIG. 1, the inventive system 10 comprises a transmitting device 12 and a receiving device 14 in communication with each other via a wireless communication channel 16. The transmitting device 12 comprises a video encoder circuit 18 in communication with an encapsulator circuit 19 in communication with a Bose-Chaudhuri-Hocquenghem (BCH) link coding circuit 20. The BCH link coding circuit 20 provides data to a bit-by-bit interleaver circuit 22 which provides interleaved data to a modulator 23. The modulator 23 then transmits data across communication channel 16 to the receiving device 14. The receiving device 14 comprises a video decoder circuit 24, a BCH link decoding circuit 26, a bit-by-bit de-interleaver circuit 28, and a demodulator 27. The demodulator 27 receives data from the channel 16. The de-interleaver circuit 28 receives data from the demodulator 27 and then transmits de-interleaved data to the BCH link decoding circuit 26. The BCH link decoding circuit 26 provides error-corrected data to the decapsulator circuit 25, which, in turn, provides data to a video decoder circuit 24.

Figure 2:
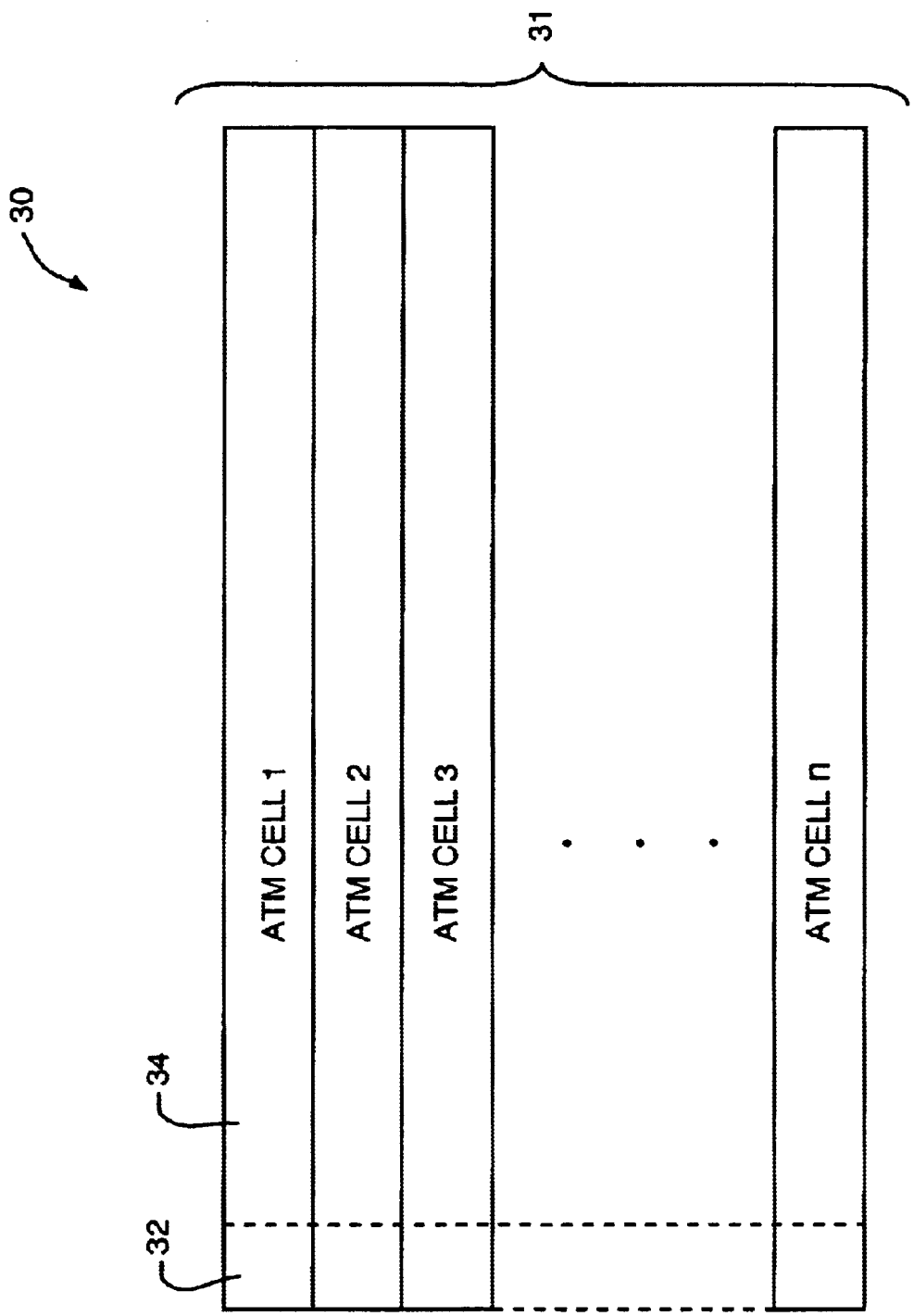
FIG. 2 shows illustrates an array of asynchronous transmission mode data cells, as used in connection with a preferred embodiment of the invention.

In operation, the present invention utilizes the well-known ATM protocol and data organization scheme to transfer MPEG video data across the wireless communication channel 16. According to a preferred embodiment of the present invention, and as shown in FIG. 2, the MPEG data is organized in fixed-size ATM cells 30, each cell including a header portion 32 and a payload portion 34, as is well-known in the art. The video encoder 18 provides encoded MPEG data to the encapsulator circuit 25. The encapsulator circuit 25 converts the MPEG data received from the video encoder 18 into the well-known ATM data format and provides the ATM data to the BCH link coding circuit 20. The BCH link coding circuit 20 is an error control coding circuit that applies a binary BCH code to the header and a BCH code to the payload of each ATM cell. Binary BCH codes are a well-known infinite class of cyclic block codes that are used to monitor the integrity of data as it is transferred from one device to another and to correct bit errors that do occur. BCH codes have good distance properties for moderate message sizes. According to a preferred embodiment of the present invention, a strong BCH code is applied to the ATM cell header 32 to ensure that the cells are delivered with high reliability. A somewhat weaker binary BCH code is applied to all payloads 34 to decrease the overhead associated with each ATM cell and increase the throughput of the system 10. Though it is preferred to use BCH codes, it is acceptable to use other known error control codes with this invention.

After having binary BCH codes applied to their respective headers 32 and payloads 34, a predetermined number of ATM cells are read into interleaver 22. The interleaver 22 reads the predetermined group of ATM cells 31 into rows of a rectangular array, as shown in FIG. 2. Then the interleaver 22 reads each bit of the ATM cells 30 to the modulator 23 column by column. Specifically, the first bit of the first ATM cell 30 is read out to the modulator 23 first. The first bit of the second ATM cell 30 is read out second. The first bit of the third ATM cell 30 is read out third, and so on until the first bit of the last ATM cell 30 in the group is read out to the modulator 23. Then, the second bit of the first ATM cell 30 is read to the modulator 23, followed by the second bit of the second ATM cell 30, then the second bit of the third ATM cell 30, until the second bit of the last ATM cell 30 in the group is read out. This interleaving methodology is continued until the last bit of the last column is read out to the modulator 23. The modulator 23 then converts the interleaved digital data to analog data that is capable of being transmitted over wireless communication channels, as is well-known in the art. The modulator 23 then transfers the interleaved and modulated data to the communication channel 16.

The interleaved data is transmitted across the communication channel 16 and received by the demodulator 27 of the receiving device 14. Though not shown in FIG. 1, the ATM cells representing the MPEG video are usually multiplexed with other ATM cells that represent voice, images, and other data when transmitted over the communication channel 16. The demodulator 27 converts the analog ATM data received over the communication channel 16 back to digital format, as is well-known in the art. The demodulator 27 then transfers the digital interleaved data to the bit-by-bit de-interleaver 28. The de-interleaver 28 performs the opposite function of the interleaver 22 and returns the received data to a de-interleaved format. Specifically, the de-interleaver 28 stores the first received bit as the first bit of the first ATM cell 30. It stores the second received bit as the first bit of the second ATM cell 30. It stores the third received data bit as the first bit of the third ATM cell, and so on. After the first bit of each of the ATM cells in the group are read and stored, the de-interleaver 28 stores the next received data bit as the second bit of the first ATM cell 30. The next received data bit is stored as the second bit of the second ATM cell 30 and the following data bit is stored as the second bit of the third ATM cell 30. This de-interleaving methodology is repeated until the last bit of the transmitted MPEG data is read and stored as the last bit of the last ATM cell 30.

The specific method of interleaving and de-interleaving described hereinabove is a preferred methodology. However, other methods of interleaving are contemplated by this invention and acceptable to carry out the purpose of reorganizing the data bits in an orderly fashion prior to transmission so that when the data bits are received and returned to their original format, any transmission error-bursts will be spread out across several ATM cells.

The de-interleaver 28 transfers the data to the BCH link decoding circuit 26. The BCH link decoding circuit 26 is an error control decoding circuit that uses the BCH codes to detect and correct data errors that occurred during transmission. The de-interleaver 28 also removes the binary BCH codes from the header 32 and the payload 34 of the ATM cell, leaving just the error-corrected ATM cells. The error-corrected ATM cells are provided to the decapsulator 25, which extracts the payload portion of the ATM cells, as is well-known in the art. Then the error-corrected MPEG data (from the payload) is transferred to the video decoder 24 which decodes the data to create images on a display unit (not shown), as is well-known in the art.

The use of the interleaving and de-interleaving technique in combination with applying binary BCH error codes to the ATM cells effectively "spreads out" the transmission errors resulting from the fading radio channel so that only a few errors appear in each cell. Specifically, a transmission error burst resulting from a severely fading channel may adversely affect many consecutive data bits as they are transferred over the communication channel 16. Because the ATM cells are interleaved before being transmitted over the communication channel 16, consecutive data bit errors actually affect only one or a few bits of a large number of ATM cells instead of affecting many bits of the same ATM cell. This situation is better than having many errors in some cells and very few or no errors in other cells because ATM cells having many errors are typically uncorrectable by spreading the errors out over many cells, the BCH codes are more effective in detecting and correcting such errors. This is particularly important for the transmission of MPEG video.

In the disclosed invention, the interleaving depth, or the number of ATM cells that make up each interleaving group, affects the performance of the system. Generally, for the same channel conditions, the greater the interleaving depth, the smaller the BER delivered to the video decoder 24 and the longer time period between severe error events. The invented system has been tested in connection with a communication channel having an inherent BER of $10^{-3}$ with slow Rician fading and K=10 dB. The fading ratio K is a well-known parameter that represents the ratio of the energy received along the direct path of transmission over the communication channel to the total reflected energy and which represents the relative severity of fading in the communication channel. The following chart sets forth the observed delivered BER and approximate time period between severe error events using the invented system, assuming a fade rate of 3 Hz and a data transmission rate of 1 Megabit/second.

| Interleaving Depth (cell) | Delivered BER | Approximate Spacing Between Severe Error Events |
|---|---|---|
| 0 | $3.73 \times 10^{-4}$ | Continuous |
| 511 | $4.3 \times 10^{-4}$ | Continuous |
| 1022 | $3.3 \times 10^{-4}$ | 2–3 seconds |
| 1533 | $2.7 \times 10^{-4}$ | 2–3 seconds |
| 5110 | $1.1 \times 10^{-4}$ | 5–10 seconds |
| 7500 | $5 \times 10^{-5}$ | 10–25 seconds |
| 10,220 | $3.1 \times 10^{-5}$ | 20–30 seconds |
| 15,330 | $6 \times 10^{-6}$ | 30–90 seconds |
| 20,000 | $2.5 \times 10^{-6}$ | 30–90 seconds |
| 30,000 | $9.2 \times 10^{-7}$ | 2–4 seconds |
| 40,000 | $6.9 \times 10^{-7}$ | 2–4 seconds |
| 50,000 | $2.6 \times 10^{-7}$ | 2–4 seconds |
| 90,000 | $1.2 \times 10^{-7}$ | Only Minor Errors |

As can be observed from the above chart, it has been found that there is no substantial benefit for interleaving depths less than 1533 ATM cells for the assumed channel conditions. Interleaving depths of 30,000 to 50,000 cells were found to be large enough to increase the spacing of severe error events to between 2 and 4 minutes. This type of video quality would be adequate for many non-interactive, non-broadcast applications. The video quality observed when using an interleaving depth of 90,000 cells approached performance seen on a non-fading communication channel, as only minor data errors were observed. An observer would have to wait roughly 20 to 40 minutes to see a severe error event using an interleaving depth of 90,000 cells.

While a preferred embodiment of the present invention has been described herein, it is apparent that the basic construction can be altered to provide other embodiments which utilize the processes and compositions of this invention. Therefore, it will be appreciated that the scope of this invention is to be defined by the claims appended hereto rather than by the specific embodiment which has been presented hereinbefore by way of example.

What is claimed is:

1. An electronic communication system, comprising:
   a transmitting device having an at least one error control coding circuit and an interleaver circuit in communication with each other;
   a receiving device having an error control decoding circuit and a de-interleaver circuit in communication with each other; and
   a communication channel over which said transmitting device transmits data to said receiving device, wherein said error control coding circuit selectively applies a first error control code and selectively applies a second error control code, said second error control code being weaker than said first error control code to minimize transmission overhead associated with said communication channel.

2. The electronic system of claim 1, wherein said communication channel is a wireless communication channel.

3. The electronic system of claim 1, wherein said error control coding circuit applies a BCH code to said data before it is transmitted across said communication channel.

4. The electronic communication system of claim 3, wherein said first error control code is a strong BCH code and said second error control code is a weaker BCH code.

5. The electronic communication system of claim 4, wherein said weaker BCH code is a binary BCH code.

6. The electronic system of claim 1, wherein said data is transmitted across said communication channel using an asynchronous transmission mode format.

7. The electronic system of claim 6, wherein said data comprises compressed video data.

8. The electronic communication system of claim 6, wherein said error control coding circuit applies a BCH code to said data before it is transmitted across said communication channel, and wherein said first error code is a strong BCH code and said second error control code is a weaker BCH code.

9. The electronic communication system of claim 8, wherein transmitted data includes a cell header and a payload, said first error control code applicable to said cell header and said second error control code applicable to said payload to ensure that cell headers are delivered with high reliability over said communication channel.

10. The electronic system of claim 1, wherein
    said transmitting device includes a modulator in communication with said interleaver circuit; and
    said receiving device includes a demodulator in communication with said de-interleaver circuit.

11. The electronic system of claim 1, wherein
    said transmitting device includes a video encoder circuit in communication with said error control coding circuit; and
    said receiving device includes a video decoder circuit in communication with said error control decoding circuit.

12. The electronic communication system of claim 1, wherein transmitted data includes a cell header and a payload, said first error control code applicable to said cell header and said second error control code applicable to said payload.

13. An electronic communication system for transmitting and receiving compressed video data using asynchronous transmission mode protocol over a fading wireless communication channel, comprising:
    an error control coding means for applying error control codes to the compressed video data, a first error control code being applied to a first portion of the compressed video data and a second error control code being applied to a second portion of the compressed video data, said second error control code being weaker than said first error control code to minimize transmission overhead over the wireless communication channel;

an interleaver means in communication with said error control coding means for interleaving the compressed video data before the compressed video data is transmitted to the communication channel;

a de-interleaver means in communication with the communication channel for de-interleaving the compressed video data after the compressed video data is received from the communication channel; and an error control decoding means in communication with said de-interleaver means for removing said error codes from the compressed video data.

14. The electronic communication system of claim 13, wherein said error control coding means is a BCH link coding circuit that applies BCH codes to the data.

15. The electronic communication system in claim 14, further comprising:

a video encoder circuit in communication with said BCH error control coding circuit;

a modulator in communication with said interleaver means and the communication channel;

a demodulator in communication with the communication channel and said de-interleaver means; and a video decoder in communication with said error control decoding means.

16. A method for transmitting fixed-size cells of data across a wireless communication channel, comprising the steps:

applying at least two dissimilar strengths of error control codes to the data;

interleaving the cells of data;

transmitting the data across the wireless communication channel;

de-interleaving the data; and detecting and correcting errors incurred during transmission of the data across the wireless communication channel.

17. The method of claim 16, wherein each cell of data comprises a header and a payload, and said step of applying an error control code to the data comprises applying at least one error control code to said header and applying at least one error control code to said payload.

18. The method of claim 17, wherein said error control code is a Bose-Chaudhuri-Hocquenghem (BCH) code.

19. A method for transmitting fixed-size cells of data across a wireless communication channel, comprising the steps:

applying an error control code to the data;

interleaving the cells of data;

transmitting the data across the wireless communication channel;

de-interleaving the data; and detecting and correcting errors incurred during transmission of the data across the wireless communication channel, and wherein the cells of data are organized in an ordered array with each cell comprised of a fixed number of ordered bits, and said step of interleaving the data comprises transmitting a single bit from each said cell in said array and repeating this step until all bits from said array of cells have been transmitted.

20. The electronic communication system of claim 16, wherein said applying step includes the substeps of:

dividing said cells into a cell header and a payload, applying a first error control code to said cell header, and applying a second error control code to said payload.

21. The electronic communication system of claim 20, comprising the substep of making said first error control code stronger than said second error control code, thereby increasing communication throughput while still providing high reliability to said cell header of each of said cells.

* * * * *